United States Patent
Schultz et al.

(10) Patent No.: US 6,453,339 B1
(45) Date of Patent: Sep. 17, 2002

(54) SYSTEM AND METHOD OF PRESENTING CHANNELIZED DATA

(75) Inventors: Thomas W. Schultz, Edina; Mark C. Bradley, Savage; Ted C. Halmrast, Bloomington; Thomas Y. Peterson, Aitkin, all of MN (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/233,870

(22) Filed: Jan. 20, 1999

(51) Int. Cl.[7] .............................................. G06F 15/16
(52) U.S. Cl. ........................ 709/206; 709/231; 707/10; 707/104
(58) Field of Search ................................. 709/206, 207, 709/217, 218, 219, 224, 229, 231; 707/10, 102, 103, 104, 200, 201, 203

(56) References Cited

U.S. PATENT DOCUMENTS

| | | | |
|---|---|---|---|
| 5,694,546 A | * 12/1997 | Reisman | 705/26 |
| 5,761,663 A | 6/1998 | Lagarde et al. | 707/10 |
| 5,768,528 A | * 6/1998 | Stumm | 709/231 |
| 5,930,801 A | * 7/1999 | Falkenhainer et al. | 707/10 |
| 5,999,968 A | * 12/1999 | Tsuda | 709/213 |
| 6,044,372 A | * 3/2000 | Rothfus et al. | 707/10 |
| 6,148,330 A | * 11/2000 | Puri et al. | 709/217 |
| 6,192,407 B1 | * 2/2001 | Smith et al. | 709/200 |
| 6,324,538 B1 | * 11/2001 | Wesinger et al. | 707/10 |
| 6,324,587 B1 | * 11/2001 | Trenbeath et al. | 709/206 |

FOREIGN PATENT DOCUMENTS

| | | | |
|---|---|---|---|
| WO | 97/15018 | 4/1997 | G06F/17/30 |

OTHER PUBLICATIONS

Bentley, R., et al., "Designing a system for cooperative work on the World-Wide Web: Experiences with the BSCW System", *Proc. of the 13th Hawaii Int'l conf. on System Sciences* (Cat. No. 97/TB100234) Wailea, HI, vol. 4, XP002143468, 297–306, (Jan. 7–10, 1997).

Kamba, T., et al., "Anatagonomy: a personalized newspaper on the World Wide Web", *Int'l J. of Human–Computer Studies*, Academic Press, NY, vol. 46, XP002086827, 789–803, (1997).

Quintana, Y., et al., "Knowledge-based Information Filtering of Financial Information", *Proc. of the Nat'l Online Mtg*, XX, XX, XP002057953, 279–285, (May 13, 1997).

(List continued on next page.)

*Primary Examiner*—Dung C. Dinh
(74) *Attorney, Agent, or Firm*—Cooper & Dunham LLP (57) ABSTRACT

A system and method for presenting data from a plurality of sources to a user. The system includes a plurality of information sources, a user interface, content storage and a server connected to the user interface and the content storage. The user interface selects data from one or more of the plurality of information sources to be identified as published content and issues content requests to access data identified as published content. The content storage stores published content and the server manages the content requests received from the user interface. The server includes a repository and a content directory, wherein the repository manages a virtual directory structure associated with published content, wherein the content directory maintains a content directory structure pointing to all published content stored in the content storage and wherein the content directory structure is referenced by the virtual directory structure in the repository.

23 Claims, 7 Drawing Sheets

OTHER PUBLICATIONS

Shklar, L., et al., "InfoHarness: use of automatically generated metadata for search and retrieval of heterogeneous information", *Advanced Info. Sys. ENg. Int'l Conf., Caise, XX*, XP000677759, 217–230, (Jun. 12, 1995).

Widom, J., "Research Problems in Data Warehousing", *Proc. of the 1995 ACM CIKM Int'l Con., on Info. & Knowledge Mgmt*, XP002143469, 25–30, (Nov. 28 to Dec. 2, 1995).

Nham, B., "Web Portal Wars", http://www.suite101.com/article.cfm/computer_news/7252, pp. 1–3, (May 5, 1998).

Nickell, J., "Web Portals Play Leapfrog", http://www.wired.com/news/print_version/email/tip/business/story/11744.html, pp. 1–3, (Apr. 17, 1998).

"Portals Into the Future: What's Up Next?", http://www.pcworld.com/current_issue/article/0,1212,7202+12+0,00.html, pp. 1–3, (Aug. 1998).

"What the Heck are Web Portals Anyway?", http://www.coppersky.com/ongir/articles/webportals.html, pp. 1–3, (Sep. 9, 1998).

Calishain, T., "What the Heck are Web Portals?", http://www.sideroad.com/search/col. 1.html, pp. 1–4, (May 7, 1998).

Gardner, D., "Netscape Takes on Yahoo for Personalized Web Pages", http://www.pcworld.com/news/daily/data/0698/980601130321.html, InfoWorld Electric, pp. 1–3, (Jun. 1, 1998).

Hu, J., "Portal envy htis the scene", http://www.news.com/New/Item/0,4,30385,00.html?owv, pp. 1–3, (Dec. 30, 1998).

Miller, M.J., "Which Web Portal is Best", http://www5.zdnet.com/anchordesk/story/story_2378.html, pp. 1–3, (Aug. 3, 1998).

* cited by examiner

*Content Repository Model...*

```
PAGE_BEGIN
<body bgcolor="WHITE">
<CENTER>
<h3>Custom Template</h3>
<hr>
<TABLE>
<TR Align=center>
<TD Align=center>
object 0<br>
<!--Insert_Web_Object0 -->
</TD></TR>
<TR Align=center>
<TD Align=center>
</TABLE>
<br>
<hr>
<CENTER>
</body>
PAGE_END

[WEB_OBJECT]
Web_Object_Count=1

[Web_OBJECT0]
webMethod=contentServer/reports/report1
```

FIG. 6

```
PAGE_BEGIN
<body bgcolor="WHITE">
<CENTER>
<h3>Custom Template</h3>
<hr>
<TABLE>
<TR Align=center>
<TD Align=center>
object 0<br>
<!--Insert_Web_Object0 -->
</TD></TR>
<TR Align=center>
<TD Align=center>
object 1<br>
<!--Insert_Web_Object1 -->
</TD></TR>
</TABLE>
<br>
<hr>
<CENTER>
</body>
PAGE_END

[WEB_OBJECT]
Web_Object_Count=2

[Web_OBJECT0]
webMethod=contentServer/reports/report1

[Web_OBJECT1]
webMethod=contentServer/reports/report2
```

FIG. 7

SYSTEM AND METHOD OF PRESENTING CHANNELIZED DATA

FIELD OF THE INVENTION

The present invention is related to computer software, and more particularly to a system and method for presenting data from a variety of sources in a uniform manner.

BACKGROUND INFORMATION

The amount and sources of information has exploded in recent years. Currently, commercial organizations have many different tools for managing that information. The organization may use a word processing application to create and edit documents, a spreadsheet program to perform calculations, one or more database tools for accessing marketing, employee and other facts, internet tools for accessing the internet and intranet tools for accessing internal company information published to an internal web site. Each tool performs in a different way; it can take a long time to master the tools needed for one's job. In addition, the learning curve required to obtain rudimentary knowledge in the use of a particular tool can discourage the user from using a tool which may provide information relevant to his or her job.

The introduction of the Internet and Intranet have made the problem worse; there has been a dramatic increase in the amount of data available to the average worker. With that has come the increased burden of how to find relevant information in this deluge of unstructured content. There is no common way to navigate, search, organize, receive, distribute and collaborate on information that is fundamental to the decision making process. Organizations, therefore, often make decisions uninformed by facts which are documented within the organization, but unknown or unavailable to the decision-maker. As business process reengineering and customer relationship management continue to grow, this challenge will intensify.

What is needed is a method of presenting data taken from a variety of sources in a uniform manner. At the same time, what is needed is an interface for accessing such data which is intuitive and user-friendly.

SUMMARY OF THE INVENTION

According to one aspect of the present invention, a system and method is described for presenting data from a plurality of sources to a user. The system includes a plurality of information sources, a user interface, content storage and a server connected to the user interface and the content storage. The user interface selects data from one or more of the plurality of information sources to be identified as published content and issues content requests to access data identified as published content. The content storage stores published content and the server manages the content requests received from the user interface. The server includes a repository and a content directory, wherein the repository manages a virtual directory structure associated with published content, wherein the content directory maintains a content directory structure pointing to all published content stored in the content storage and wherein the content directory structure is referenced by the virtual directory structure in the repository.

BRIEF DESCRIPTION OF THE DRAWINGS

In the drawings, where like numerals refer to like components throughout the several views.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
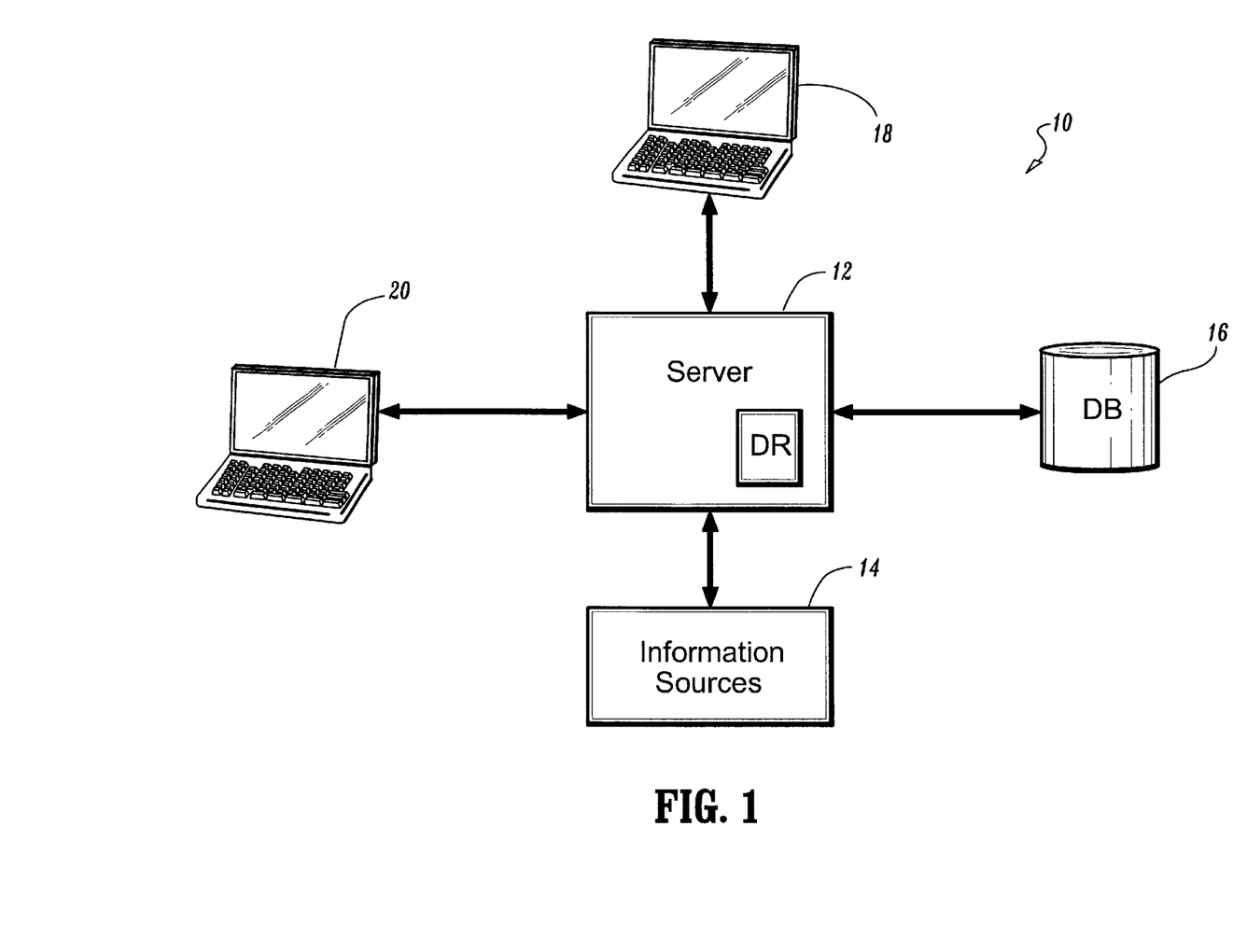
FIG. 1 illustrates a system for displaying information from different sources.

A system for displaying information from different sources is shown in FIG. 1. In FIG. 1, system 10 includes a content server 12 connected to one or more information sources 14, to a storage device 16 and to one or more data entry devices (18, 20). In one embodiment, server 12 includes a repository 22 and a content directory 24 as will be described below. In one embodiment, data entry device 20 is a user terminal or workstation and data entry device 18 is an administration terminal or workstation.

As noted above, to-date there is no common way to navigate, search, organize, receive, distribute and collaborate on information from disparate sources that is fundamental to the decision making process. Organizations therefore are reduced to making decisions on somewhat less than all the facts at their disposal. To address this need, in one embodiment system 10 uses a World Wide Web paradigm to store and access data originating from areas throughout the organization. System 10 provides a common repository or library. Systems and applications throughout the organization can contribute content to the library by publishing to it.

In one embodiment, users and/or systems contribute to the organization's library by publishing unstructured content to storage device 16 and by accessing that content via object keys stored in repository 22. In such an embodiment, repository 22 is organized as a hierarchy of folders. Objects can be organized by user or subject and can be published or deleted from repository 22. In addition, the folder structure allows the user to navigate the objects in a structured manner.

Information within the library is organized into channels. In one embodiment, channels are a logical organization of information grouped by a particular subject. Users can subscribe to personal, workgroup or public channels to receive broadcasted information on a specific subject. Once subscribed to a channel, users can "tune in" to browse its headlines—and to determine whether to open an attached report object for more detail. Users can also create their own channels to organize headlines generated by their own personal messengers. Channel information is stored within repository 22.

Data entry device 20 includes a user interface. In one embodiment, the user interface allows the user to select data from the one or more of the plurality of information sources, label that data as published content and issue content requests to access published content. In one such embodiment, data entry device 18 runs Java applets under control of the system administrator to present a portal-like interface to business intelligence. Data entry device 20 could also be configured to run such Java applets. The web portal takes the form of a newspaper. Useful information from one or more channels can be selected by the user; in one embodiment, that information is accessed through headlines within a personalized electronic newspaper, or newspage. In one such embodiment, a default template is provided for each newspage. Users can customize their newspage, however, to display the most timely headlines from subscribed-to channels.

In one embodiment, an automated process termed a messenger alerts the user when an event pertinent to that user has occurred. Each messenger is defined by a name, description and event. In addition, messengers may include a link to a referenced content page.

In one such embodiment, the messenger's alert takes the form of an e-mail to the user. In another such embodiment, the alert is presented as a headline on the user's newspage (e.g., a newspage's headline changes when new content is available on a channel). In the newspage embodiment, messengers search behind the scenes for headlines that have appeared on subscribed-to channels over a defined time period. Those headlines are then displayed on the user's newspage.

In one embodiment, an agent running on information source 14 generates a report at a first scheduled time. For example, information source 14 may be a data warehouse and every Monday night the agent generates a detailed analysis of sales figures based on data stored within the data warehouse. As long as the report is stored such that it replaces the old report, any access to the report will always access the latest version of the report.

In this example, a messenger operating within system 10 is set to remind a user to review the report at a second scheduled time (e.g., every Tuesday morning). On Tuesday morning the messenger notifies the user to review the report (e.g., by headline or e-mail). The user can then review the report by selecting the content associated with the messenger. In another embodiment, an agent running within information source 14 initiates a messenger in server 12. The messenger then notifies the user that a particular event has occurred.

In another embodiment, information source 14 publishes directly to server engine 26 and can be accessed from there.

In one embodiment, one headline is displayed for each channel. The user can subscribe to public channels to receive information on specific subjects. Once the user has subscribed to a channel, he or she can "tune in" to browse headlines or link to the reports attached to the headlines to obtain more detail. In one embodiment, channels can be created by users to organize headlines generated by the user's personal messengers.

Figure 2:
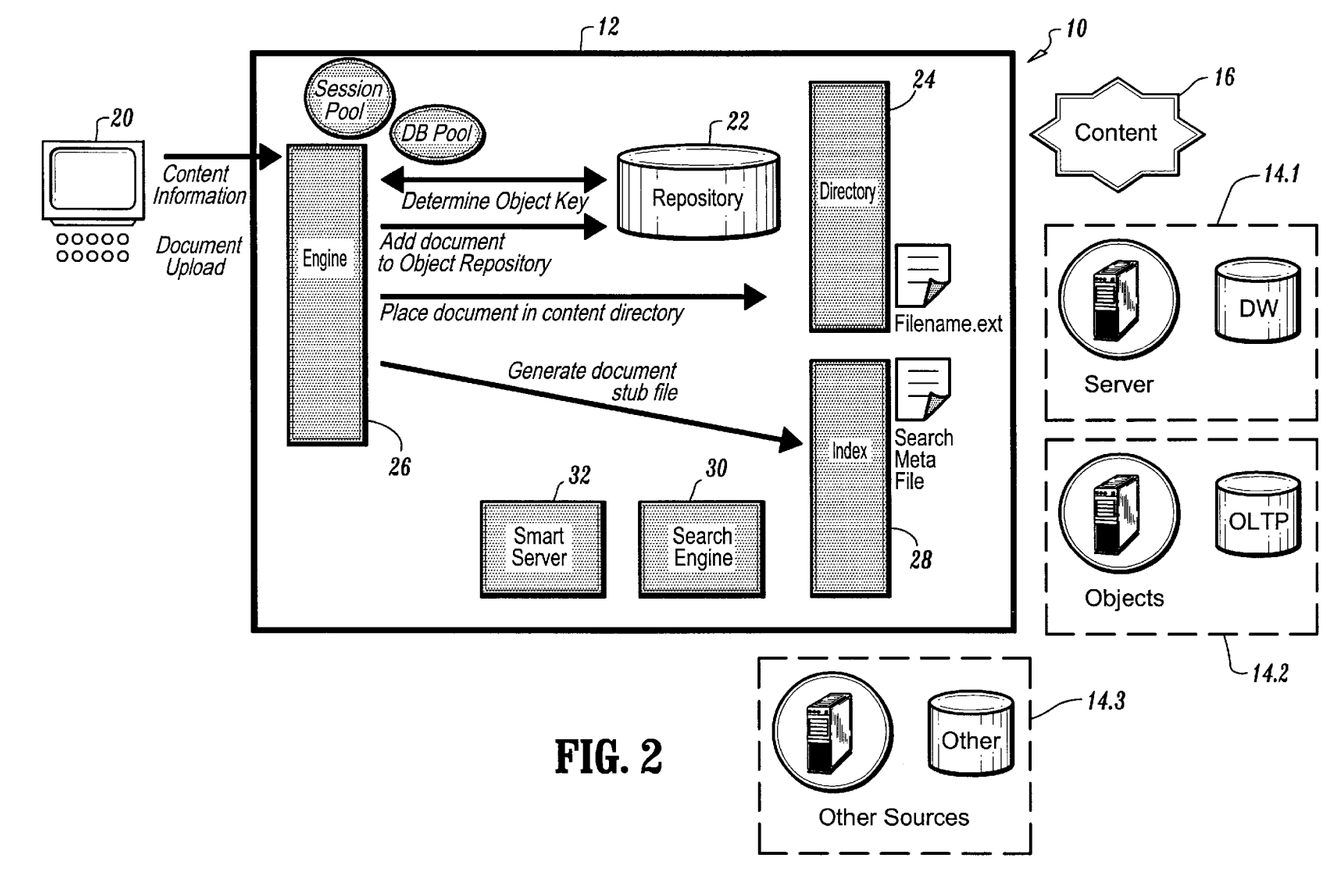
FIG. 2 illustrates one embodiment of the system of FIG. 1.

In one embodiment, storage device 16 stores published content. Published content is then accessed via server 12. Such an approach is shown in FIG. 2. In FIG. 2, data entry device 20 is connected to server 12. Server 12 includes a server engine 26, a repository 22 and a content directory 24. In one embodiment, search meta files representing published content are stored in an index 28 to facilitate searching by search engine 30. Engine 26 receives a document to be published as content, associates an object key with that document and stores the object key in repository 22. In one such embodiment, a pointer to the object stored in storage device 16 is placed in directory 24 and a document stub file is written to index 28. Two information sources 14 are shown in FIG. 2: a data warehouse 14.1 and an on-line transaction processing system 14.2. In addition, other information sources 14.3, such as personal computer applications generating word processing or spreadsheet documents, can publish to the library of system 10. Indeed, in one embodiment, executables such as software drivers are published to the library and then read and installed by the user.

Server engine 26 manages content requests received from the user interface. In one such embodiment, repository 22 manages a virtual directory structure associated with published content and content directory 24 maintains a content directory structure pointing to all published content stored in storage device 16. In one embodiment, the content directory structure is accessed through object keys stored in the repository's virtual directory structure.

Documents may be linked to other documents. In one embodiment, hypertext links within a document point to other documents within repository 22.

In one embodiment, server engine 26 includes a scheduler which monitors and schedules processing of messengers. In one such embodiment, server engine 26 also schedules and manages generation, on a regular basis, for all public, workgroup and personal newspages. For instance, server engine 26 may be configured to generate newspages daily, weekly, or on some other periodic basis.

In one embodiment, server engine 26 is composed of multiple Java servlets. The servlets are run as threads, with each thread performing a particular function. For example, when a request is made to publish content, a thread is scheduled to do that on the user's behalf. In one embodiment, when the servlets generate content to go to the user at device 20, they present the content formatted as HTML documents to be displayed on the user's browser.

In one such embodiment, the system administrator operating on data entry device 18 also has access to server engine 26 through an HTML interface. In addition, in one embodiment, system 10 provides JAVA applets to the administrator to aid him or her in performing more complex, mundane tasks.

In one embodiment, repository 22 is stored within a relational database such as an SQL server. Content is stored in a flat file.

In one embodiment, repository 22 includes a permission-based security mechanism for restricting access by a user to content stored in the content server. Users are placed into groups and access to content is limited through permissions granted to users, groups and the enterprise. In one embodiment, the least sensitive information is available with global read permission. More sensitive information may be limited to particular groups or users. In one such embodiment, an authentication mechanism (e.g., user-entered password, one-time password, biometric information, etc.) is used to ensure that a user is actually the user he presents himself to be.

In one embodiment, as is shown in FIG. 2, system 10 includes an index 28 and a search engine 30. The user interface includes means for accessing content via search engine 30. In one such embodiment, searches are performed by a Cybotics search engine manufactured by Cybotics Technology, Ltd. of Houston, Tex. Information on the Cybotics search engine can also be found at http://www.cybotics.com.

In one embodiment, storage device 16 is a combination of local and remote storage. In one such embodiment, content to be published to repository 22 is left in its original location. Directory 24 then points to a pointer in local storage used to access the content in its remote location. In one such embodiment, content may be stored within a different organization's web site. In that case, the pointer may be an HTTP reference to the information stored on that website. At the same time, other content in that channel may be stored internally, or at another location within the organization. In these cases, in one embodiment, the pointer takes the form of a server location and index number. Users accessing content within that channel would not have to be aware of where that content is stored. It is just there.

In one embodiment, portions of content are stored in a compressed format such as a zip file. Server 26 automatically unzips compressed files before presenting them to the user.

In one embodiment, device 20 is connected to server 12 over a connection such as a telephone line. A user logging into server 12 from a remote device 20 can retrieve content as is logged into the local network. In one embodiment, the user can select to be placed into a compressed mode where content is compressed before transmission over the telephone line and then decompressed at the user's end. Such an approach reduces the volume of data to be transferred over the telephone line.

In one embodiment, the library is structured as enterprise, work group and personal work areas. Folders can be created within each area and content can then be published to the folder. In one embodiment, server 26 sets access permissions for the content automatically as a function of the area to which the content was published.

Server 12 can be a distributed environment. That is, system 10 can have multiple content servers. In one embodiment, only one server is the master (i.e., master server 40). It has the database or repository assigned to it. One such embodiment is shown in FIG. 3.

Figure 3:
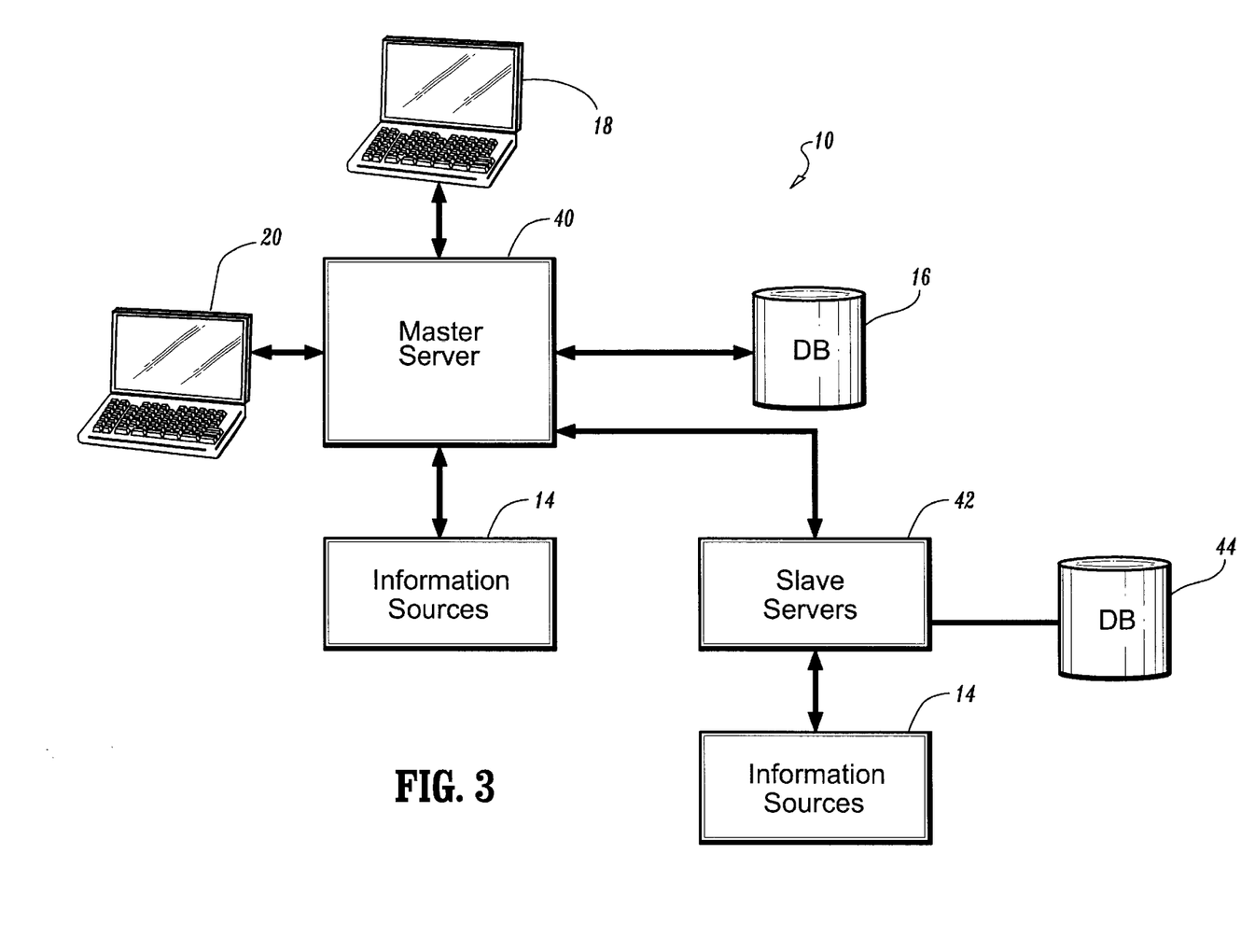
FIG. 3 illustrates a distributed embodiment of the system of FIG. 1.

In the system shown in FIG. 3, user terminal 20 and administration terminal 18 are connected through master server 40 or through one of the slave servers 42 to storage device 16. Master server 40 in turn is connected to one or more slave servers 42 and to one or more information sources 14. Slave servers 42 are, in turn, connected to a storage device 44 and to one or more other information sources 14. Content can be stored on any one of these servers (40, 42) and is accessed, via the repository stored in master server 40, through a content directory on each of the servers. In one embodiment, if one attempts, through a first server, to access content stored on an inaccessible or unavailable server, the master stores the task into a task table for execution when the inaccessible server once again becomes accessible.

In another embodiment, when master server 40 receives a service request that says delete content, it sends that request to the appropriate slave server 42. The master then operates under the assumption that the slave has gotten the request and deletes the reference to the content from the repository tables.

In one embodiment, Remote Method Invocation (or RMI) is used to communicate back and forth between servers 40 and 42. If RMI should go down, such that the server is not available, and there is something scheduled that the server is supposed to do, master server 40 schedules tasks for the disabled server 42 to perform when it comes on line. In one embodiment, a content directory 24 exists on each of the servers 42. If a user logged into one of the servers 42 tries to delete a published document, that server 42 contacts master server 40. Master server 40 looks in repository 22 and determines where the published document currently is stored. If the document is stored in an unavailable or inaccessible server 42 (e.g., one having problems with RMI connectivity), server 40 queues up a service request to actually delete that content when disabled server 42 comes back up. When connectivity is reestablished, server 42 receives messages telling it what to do and what it missed.

In one embodiment, repository 22 is distributed across two or more servers 40.

One embodiment of a content server (such as servers 12, 40 and 42) will now be described. As noted above, content server 12 stores and maintains content for distribution. Content is stored in storage device 16 and is accessed via repository 22. In one embodiment, repository 22 includes multiple tables which organize and track properties of the data.

In one embodiment, repository 22 is structured for fast access. Everything in server 12 is considered an object. Each object has an identifier and its relationship to other objects is defined via a relationship table. As noted above, content server 12 can be implemented as a set of Java servlet classes that are initiated via URL calls to content server 12. The class structure consists of a main servlet (IACS) that controls access to content. IACS in turn subclasses other functionality. The classes which support IACS include:

Put—places documents in the content database
Get—retrieves content from the content database
Serve—serves documents to outside callers
Prop—generates details of an object (e.g., owner, group, etc.); also allows deletion/creation of an object type
Agent—provides administrator access to messenger functionality while maintaining the repository information regarding messenger creation, deletion and properties Profile—provides administrator access to profile information while maintaining the user group and world group table structure Search—provides the support functionality for object searching. The caller specifies the type of object to search and the class will search repository 22 and return those objects that match the object type. Can be used for documents, messengers, channels, etc.

User—provides the support functionality for all user objects; provides for addition and deletion of user objects.

In one embodiment, the administrator has the ability to select a template to be used for content. Such a capability is useful for enforcing a standard look and feel between users, across workgroups, or even across the enterprise.

In one embodiment, content server 12 automatically deletes content when it expires.

Content server 12 includes a Publishing API used to publish to and retrieve data from content server 12. In one embodiment, a URL-based Web interface is used for communication between the user and content server 26. The call specifies which API to use and generates an HTML page to return to the user.

In one embodiment, all servlet-object communication and publication calls are made through an API module. When making such calls, an administrative username (UN) and password (PW) must be provided on the URL line. In such an embodiment a command such as
http://[server]/servlet/IACS/Api/usersandgroups?UN= [admin username]&PW=[admin password]
is used to retrieve a group-user list via content server 12. IQ objects queries the servlet via the URL call to content server 12. Content server 12 returns a text delimited list the caller can parse for information. In one embodiment, the text delimited list is of the format
[Group/User]~[Name of user or group]~[object key of user or group]
For example, the list may appear as follows:
g~aurora~4
u~mbradley~0
u~tschultz~2
g~admin~3
The owner object keys and the group object keys are returned when publishing a chosen document.

The caller can assume that every user is a member of group public, so content server 12 does not have to return this group and its users.

To retrieve a folder list defining what the directory structure looks like, the call is:
http://[server]/servlet/IACS/Api/folderlist?UN=[admin username]&PW=[admin password]
The content server returns a text-delimited list that looks like this:
2~-1~Test Folder2~0~1~r wxrwxrwx
10~2~Public~0~14~r wxr-wr-w
23~10~Another test~15~14~r wxrwx - - -
27~10~Another folder~0~1~r wxr-xr-x
. . .
. . .
where the format is:
[object key of folder]~[object key of parent folder (-1 means no parent, it is a root folder)]~[owner object key (user)]~[group owner object key]~[permission string]
For example, line number 3 above indicates that this folder has object key 23, is owned by folder object key 10, has a title of 'Another test,' is owned by user object key 15, is owned by group object key 14, and has the permissions 'rwxr-xr-x' (755 in Unix octal).

In one embodiment, the folder object key is used to name the parent of the chosen published document.

To retrieve a list of categories under which a document may be published, the URL call is:
http://[server]/servlet/IACS/Api/categories?UN=[admin username]&PW=[admin password]
The content server returns a text-delimited list that looks like this:
Sports~0
Business~1
Leisure~2
. . .
. . .
where the format is:
[Category description]~[ID of category]
In one embodiment, system 10 is designed such that the ID of the chosen category is submitted with the document when the document is published.

To publish a document to the content server, the URL call is:
http://[server]/servlet/IACS/Api/publish?UN=[admin username]&PW=[admin password]&TITLE=this+is+ a+test&FILENAME=text.txt&PARENT= 4&HEADLINE=a+headline&DESCRIP= descrip&ISLINK=0&DOCTYPE="published document"&DOCSIZE=45&LOCALE=en_ US&OWNERKEY=0&GROUPKEY=1&PERMS= rw-rw-r-&expires=-1&VERSION=0&CAT=0

TITLE is a short title for the document and is what the user clicks to view/save content.

FILENAME is the filename that the user will see when the mouse pointer is positioned over the [title] of the document when displayed in the content server. This is also the name that the browser uses as a default saved filename when the user clicks the link and chooses to save the file.

PARENT is the object key of the parent folder that this document is placed in—this should be a value provided with the 'folderlist' API call.

HEADLINE is the 80 column text field that is a short descrip of the document and is visible when viewing a document/folder list in the content server.

DESCRIP is a more detailed description.

ISLINK provides a way to publish URLs. This is either 1 if this is a URL or 0 if it is not.

DOCTYPE identifies document types (such as published document or folder).

DOCSIZE is the size in bytes of the content (or 0 for folders).

LOCALE is provided here for Internationalization purposes. This will normally be en_US for English documents.

OWNERKEY is the owner object key that this document will be published under.

GROUPKEY is the group object key that this document will be published under.

PERMS is a nine character permission string for the document.

EXPIRES is an integer that is an epoch date in seconds or -1 if it never expires.

VERSION is the version of the document if duplicates are made.

CAT is the category ID chosen. The categories and their IDs can be retrieved via the URL call 'categories.'

The content server returns a text list. In one embodiment, a string such as C:/inetpub/cs/22/25 is returned for a document while a string such as C:/inetpub/cs/22/ is returned for a folder. The path for the document is the path to the folder in which the document is place. The name of the document is appended to the path. Therefore, for the example above, the path to the document is "c:/inetpub/cs/22/" while the name of the document is the numeral five. (The name of the document is based upon the object key inserted into the content server database (determined at the point of insertion).) Note, if this document type is "published document" it is embedded into the current user's template when displayed.

The path of the folder in the above example is "c:/inetpub/cs/22/". The newly created folder has the object key 22. No action is needed to create this folder, as content server 26 has already created it.

Content repository 22 consists of records of published content in a relational database. Each record has a unique identifier and contains information about the published content.

Each record in content repository 22 contains all information from a specific publishing event or events. In one embodiment, messages can be attached by nonowners to documents. This is useful, for instance, when trying to track comments on the content of the document. The record in content repository 22 includes a mechanism for tracking the comments and for displaying the comments to the user.

In one embodiment, the content information is stored in a virtual filesystem so the content may physically exist in multiple databases on multiple platforms. In the embodiment described below, some fields are mandatory and are indicated in the description. Content repository 22 consists of multiple tables. Everything entered into repository 22 is considered an object. Objects are referenced via an OBJECTKEY which is assigned as new objects are entered into the database. Relationships between objects are defined in a RELATIONSHIPS table. A content repository model is shown for illustration in FIG. 4. By using this design virtually all objects and their relationships can be stored and retrieved such that the interdependencies can be maintained throughout the enterprise. This design is based on the metadata definition.

Figure 4:
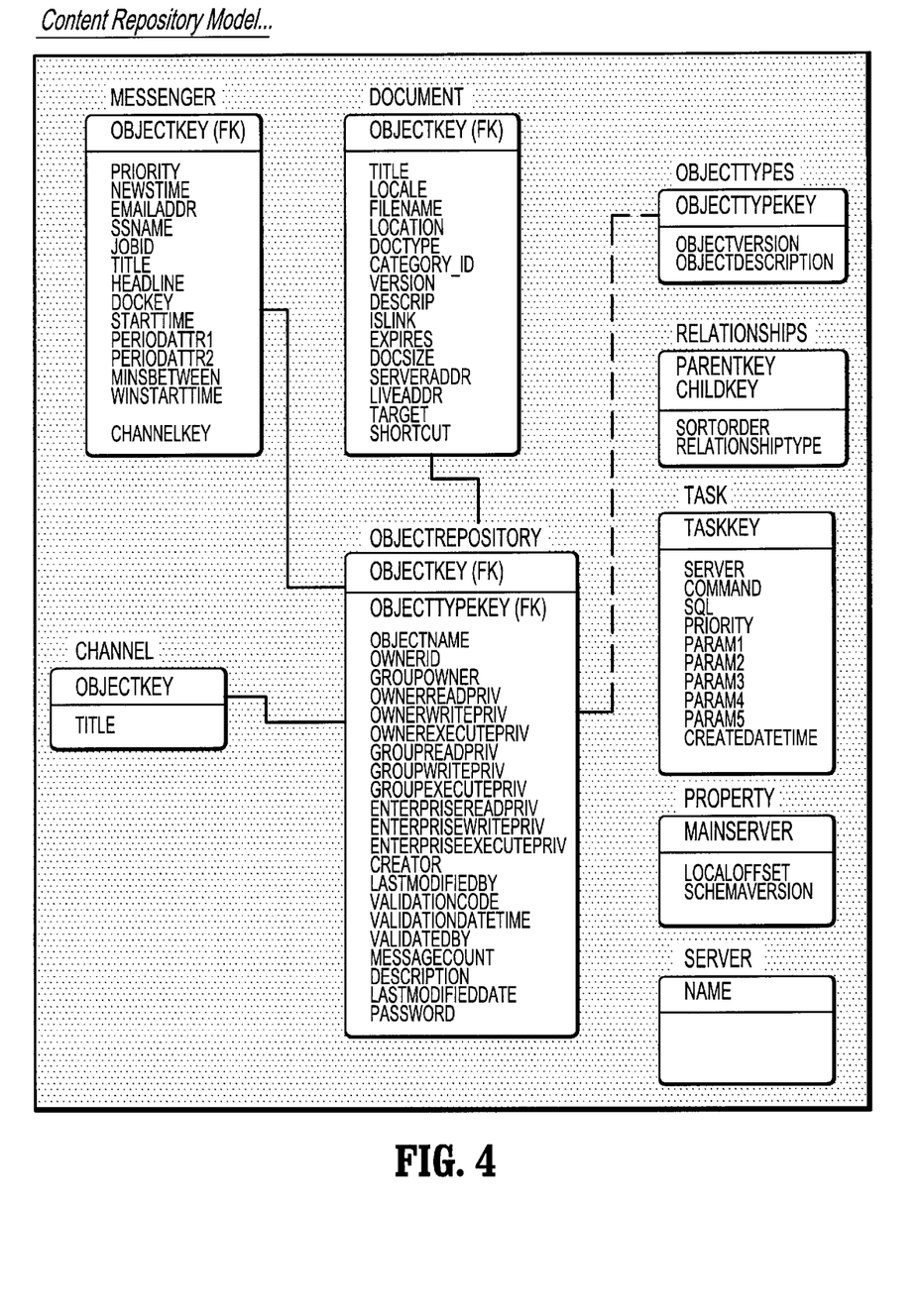
FIG. 4 illustrates objects within an object-oriented content repository model.

The object repository table (OBJECTREPOSITORY) defines each individual object stored in content server 26. The table includes one or more of the following fields:
OBJECTTYPEKEY
OBJECTNAME
OWNERID
GROUPOWNER
OWNERREADPRIV
OWNERWRITEPRIV
OWNEREXECUTEPRIV
GROUPREADPRIV
GROUPWRITEPRIV
GROUPEXECUTEPRIV
ENTERPRISEREADPRIV
ENTERPRISEWRITEPRIV
ENTERPRISEEXECUTEPRIV
CREATOR
LASTMODIFIEDBY
VALIDATIONCODE
VALIDATIONDATETIME
VALIDATEDBY
MESSAGECOUNT
DESCRIPTION
LASTMODIFIEDBYDATE
PASSWORD The variable OBJECTTYPEKEY identifies the class of document. The remaining variables have names that are self-explanatory. (In particular, MESSAGECOUNT is a count of the number of messages attached to that particular document.)

The object types table (OBJECTTYPES) defines the types of objects available in system 10. Object types include USER, GROUP, DOCUMENT, CHANNEL, FOLDER and MESSENGER. The object types table is indexed by OBJECTTYPEKEY and includes OBJECTVERSION and OBJECTDESCRIPTION.

The relationships table (RELATIONSHIPS) maintains the relationships between all types of objects. It is indexed by PARENTKEY and CHILDKEY and includes SORTORDER and RELATIONSHIPTYPE.

The document table (DOCUMENT) defines the properties for a published document. It is indexed by OBJECTKEY, a unique KEY that is internally generated by system 10 for this document. The document table includes:
TITLE—A Synopsis of the content. This field is used to generate headline information.
LOCALE—The locale where the document was generated.
FILENAME—The name of the file that contains this content (mandatory).
LOCATION—The location of this document. It can be either URL or a location on the existing file system (mandatory).
DOCTYPE—The MIME type for this document.
CATEGORY_ID—The category assigned to this document. The category can be created by the administrator and provided as an option when searching. The default category will be "none" (optional).
VERSION—The version of this document (optional).
DESCRIP—A description of the content (optional).
ISLINK—Indicates if this is link to content (mandatory).
EXPIRES—The date this document expires. Used by an auto-clean routine which cleans the repository periodically (period selected by administrator). Defaults to never expiring.
DOCSIZE—The size in bytes of the document (generated).
SERVERADDR—The address of the server where the content of this document is stored (generated).
LIVEADDR—The address of where this document is currently being served (generated).
TARGET—Identifies where to place the text within the browser window.
SHORTCUT—If present, an object key pointing to the real document.

The property table (PROPERTY) defines the master content server within a distributed architecture. In addition, it defines the offset (LOCALOFFSET) from Greenwich Mean Time (GMT) and language for the master content server (SCHEMAVERSION).

The channel table (CHANNEL) manages the definition of all channels. It is indexed by OBJECTKEY and includes the channel title (TITLE) of the channel to which the document was assigned.

The messenger table (MESSENGER) manages the definition of all messengers. It is indexed by OBJECTKEY and includes the priority (PRIORITY) and time to run (NEWSTIME) of the messenger. In one embodiment, the messenger table includes an e-mail address to send message (EMAILADDR), the name of the server which generated the messenger (SSNAME), a job ID (JOBID) associated with the messenger and used to delete the job from the server at user's request, a name associated with the messenger (TITLE), the headline (HEADLINE) that appears when the messenger executes, an index key (DOCKEY) into the DOCUMENT table, a start time (STARTTIME) for the messenger, one or more period attributes (PERIODATTR1 and PERIODATTR2), an interval of minutes (MINSBETWEEN) between messenger updates to the newstime and a channel key (CHANNELKEY) representing the channel to which the messenger is assigned.

The server table (SERVER) identifies content servers available in a distributed architecture.

Finally, FIG. 4 also includes a task table (TASK) used to identify tasks that need to be completed in a distributed architecture. It is also used to schedule E-mail messengers.

In one embodiment, a thin security model is supported by content server 12. The security model is implemented in a relational database and consists of records which identify each user of the content server. In one embodiment, the records are initially created by the administrator or by an autoload using LDAP (Lightweight Directory Access Protocol) or NIS (Network Information System) files. Commna-delimited files could also be used to autocreate a number of users. Each record has a unique identifier for each user and contains specific information about that particular user. Each user in turn is assigned to a group when created. The default group for all users will be the public group. When creating content, the owner can specify which groups can access the content. In addition, the owner can specify the level of access for each user, workgroup and public access. The level of access or permission to the content is based upon the Unix scheme with read, write and execute permissions.

In one embodiment, the user group table (USERS) maintains definitions of all users and their individual authentication strategies. It is indexed by OBJECTKEY, a unique ID that is internally generated by system 10 for this document. The user group table includes one or more of the following fields:

FNAME—User first name (optional).
LNAME—User last name (optional).
USERNAME—Unique name for this user (mandatory).
PASSWORD—Password assigned if this is a user (mandatory).
DEFAULTGROUP—User or group assigned to this entry (mandatory).
IA_ID—Index to the internal ID. The internal ID is the ID used to access the other systems (see IA_ID) (mandatory).
E-MAIL—E-mail address for this user. Used for messenger communication with this user (optional).
ADDRESS1—The user's mail address1 (optional).
ADDRESS2—The user's mail address2 (optional).
CITY—The user's mail city (optional).
STATE—The user's mail state (optional).
COUNTRY—The user's mail country (optional).
ZIP—The user's mail zip (optional).
HOMEPHONE—The user's home phone (optional).
COMPANY—The name of the company the user works for (optional).
TITLE—Title of the user (optional).
BUSPHONE—The user's business phone (optional).
FAX—The user's fax number (optional).
DEPARTMENT—Department which the user is a member (optional).
PAGER—The user's pager number (optional).
CELLPHONE—The user's cellular phone (optional).
TEMPLATEPTR—The pointer to the template currently being used for this user (internally generated).

The IA_ID table (IA) contains the generic user id and password used to access other information services 14 via server 26. IA_ID is an index to the internal ID. (The internal ID is the ID used to access the other systems.) It includes a generic user-id (USERNAME) and a generic password (PASSWORD).

The group table (GROUPS) defines the existing workgroups. OBJECTKEY is a unique ID that is internally generated for this document. GROUPNAME is the name of the group to be associated and IA_ID is the index to the internal ID.

The transaction log table (TRANS_LOG) maintains a log of all transactions which occur in system 10. It is indexable from either OBJECTKEY or from the USERS group via the USERKEY.

This table contains transaction log information which can be used by the administrator. CREATEDATE is the date this entry was created. It is generated by system 10. ACTION is the action requested by the user. It too is generated by system 10. ERRATA is a list of any errors resulting from the action.

As noted above, a profile is created for each user to allow him or her flexibility in the creation of their personal desktop environment. The profile contains the format of their news, their channel selection as well as the folders that they want to view.

The user's profile is accessed via a profile table (PROFILE). In one embodiment, the profile table is accessible from the USERS table via OBJECTKEY. The profile table contains the specifics for the user, such as channels that the user wishes to see, which channels appear on their newspaper, the duration of news on their newspaper, their e-mail address for responses, etc. Each user has access to and is able to change/manipulate these fields.

In one embodiment, news window column (NEWSWINDOW) has a time duration used to determine which news entries the user wishes to see on the news page. The news relationship ID (NEWSRELKEY) is the entry in the Relationships table entitled "RELATIONSHIPTYPE." The template entry (TEMPLATEKEY) specifies which template is to be used when content is delivered to this user.

The template table (TEMPLATE) defines the templates available on system 10. The table is indexed via a template key value (TEMPLATEKEY). In one embodiment each user as well as each group has an entry in the template. In addition, there is a global entry. The record of choice is the user's profile record since it is assumed that the user's choice should be maintained across the different groups on which the user resides. The profile table's search sequence is modeled after the Unix user group world model, so in the event that there is no entry for a field in the user record, the user's prime group (defaultgroup in the user table) will be searched for an entry. If one is not found in the prime group entry, the global profile entry will be searched. The relationships between the user and the channels and news will be made with the relationship table. The following is an example of a relationship table entry:

| Parent | Child | Sort | Relationship Type |
|--------|-------|------|-------------------|
| Tim | Sports | 0 | News |

Figure 5:
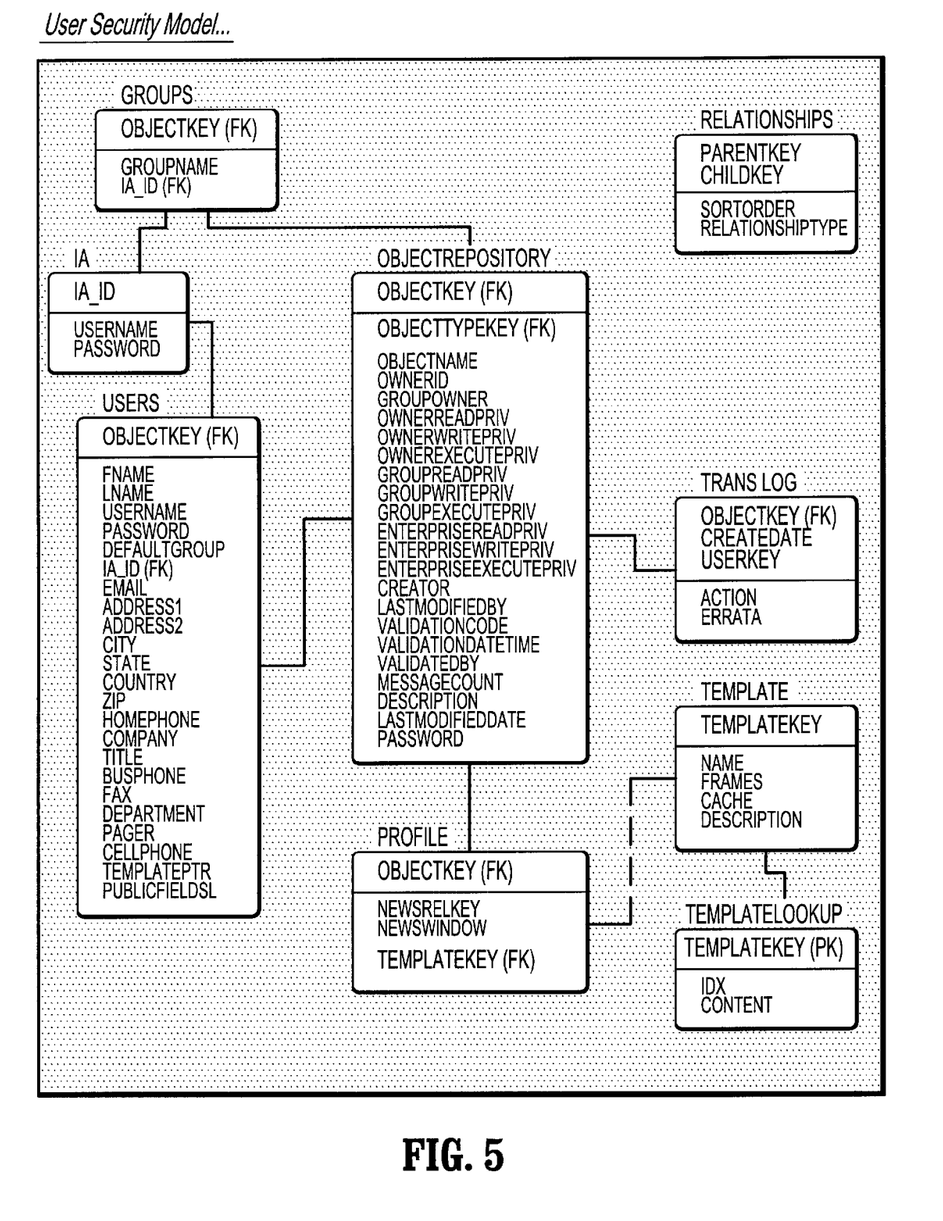
FIG. 5 illustrates objects within an object-oriented user security model.

The template lookup table (TEMPLATELOOKUP) defines each customizable component of a template. In the embodiment shown in FIG. 5, the template lookup table is accessed via TEMPLATEKEY.

In one embodiment, profile table (PROFILE) contains selections made by users that must be remembered across reboots of the content server.

Content server 12 has access to channels. As noted above, the channel concept is the creation of groups for grouping documents for organization and retrieval in the content server. Channels can consist of private channels that are created by individual users or public channels that are created by administrators. Users have the ability to create, modify and delete private channels that they have created, but only administrators are able to administer and maintain public channels.

In one embodiment, each channel table (CHANNEL) contains all information related to a particular channel. Content server 12 assigns an internal number to each channel. This internal number has an associated name for the channel. The owner of the channel is able to change the channel name but not the internal channel number. The channel table has an OBJECTKEY entry that links it back to the OBJECTREPOSITORY table. From the OBJECTREPOSITORY table the channel owner, creator, security information can be obtained. A name associated with the channel is stored in the TITLE field.

When a user accesses a particular piece of data, be it a report, document, or any other unstructured piece of data, many times they would like to see that information on a daily, weekly or monthly basis. This finctionality can be provided by allowing users to set up personalized messengers to execute predefined actions depending upon a time interval. The user may be notified via e-mail or message to a channel when a particular event occurs. In one embodiment, all messenger events are time related. The messenger delivers a predefined message that may have content associated with it. If content is associated, this content appears when the messenger is selected from a channel. Messengers without associated content simply deliver reminder messages when a particular event occurs.

To create an messenger, the data to be retrieved must be saved and accessible to the user. In one embodiment, users are able to create, edit and delete their personal messenger. In one such embodiment, the administrator has the ability to control which users have the capabilities to create and modify messengers.

In one embodiment, content server 12 allows multiple formats of the presentation of data in Web pages. This is done with the concept of page templates. Page templates are created by the administrator and saved on content server 12. When a request is made to view a page, the location of the page template is provided on the URL with a template=X name value pair (X is the name of the template). If the template value pair is not provided on the URL, the default page template specified in the profile is used.

When a request is made, content server 12 combines the page with the specified objects and serves the combination to the user.

In one embodiment, a number of default page templates are provided in system 10. Each template has an entry in the TEMPLATE and TEMPLATELOOKUP tables shown in FIG. 5. In addition, there is a template directory within content directory 24. Furthermore, in one such embodiment, an image directory stores template specific images, a frameset active content server file stores frames templates and a main active content server file stores basic navigation management information.

In one embodiment, each page template includes customizable areas used to give each page a customized look and feel. In addition, utility macros are provided to allow the user to change or specify what is displayed within the template.

In one embodiment, templates can be edited and saved using a template editor. In addition, new templates are created using the template editor. In one such embodiment, an administrator creates a new template by first selecting a predefined template on which to base the new template. The administrator names the template, performs any customization desired within the customizable areas, saves the resulting template and assigns the template to a user or workgroup. An entry for the new template is created in the TEMPLATE table and information representing changes to the customizable areas is stored in the TEMPLATELOOKUP table. A new template directory is created in the content directory and the main active content server file is copied to the new template directory. If the template was based on a default frames template, the frameset active content server file is also copied to the new template directory. In one embodiment, the TEMPLATEKEY and the template directory are automatically assigned by system 10.

In one embodiment, customizable areas can be modified by entering HTML code for the display of buttons, headings, headers/footers and titles. BACK and NEXT buttons in the template editor are used to navigate to the template areas to be changed.

In another embodiment, each page template is an HTML file created by the user. The template has section tags for the content objects. These tags will indicate where the particular content object should appear. For instance, in one embodiment the tags have the format of <!--WOBx_START--><!--WOBx_END--> where x is the number of the particular object. Each object has a related section named WOBx where x is the section. The section has the associated parameters needed to complete the call to get the content object. There can be N tags defined, where N is specified in the WOBCount variable in the [WOB] section. When the call is made to display a document for a user, the template is used as the base to create the Web page. Content server 12 can then scan the template looking for the WOB section. When it encounters this section it can determine from the WOBCount tag how many objects are to be placed in this page. It can then scan for each section inserting objects between the <!--WOBx_START--> and<!--WOBx_END--> (where x is the section number). The specifics for these objects are obtained from the corresponding [WOBx] section (where x is the section number).

Figure 6:
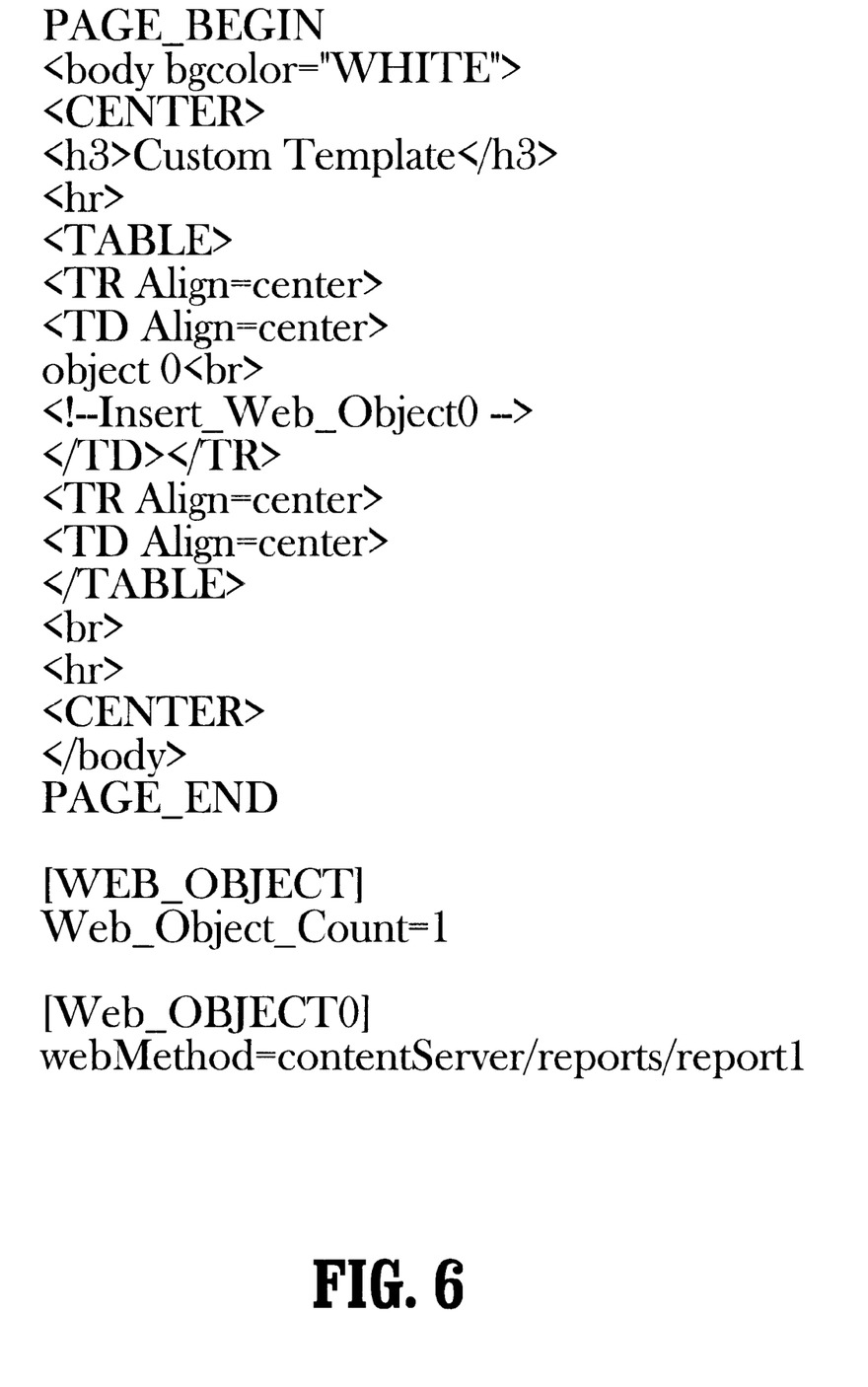
FIG. 6 illustrates one embodiment of a page template used to present one object on a user's display.

An example of a template with one object is shown in FIG. 6. The template begins with the "PAGE_BEGIN" tag. HTML to be displayed follows the tag. As part of the HTML the "<!--Insert_Web_Object0-->" comment line specifies where the object will be placed in the HTML text. The "PAGE_END" tag indicates the end of HTML text and beginning of control text. The "[WEB_OBJECT]" section specifies one object by the "Web_Object_Count=1" tag. The "[Web_OBJECT0]" section specifies what object should be inserted by the "webMethod=contentServer/reports/report1" tag.

Figure 7:
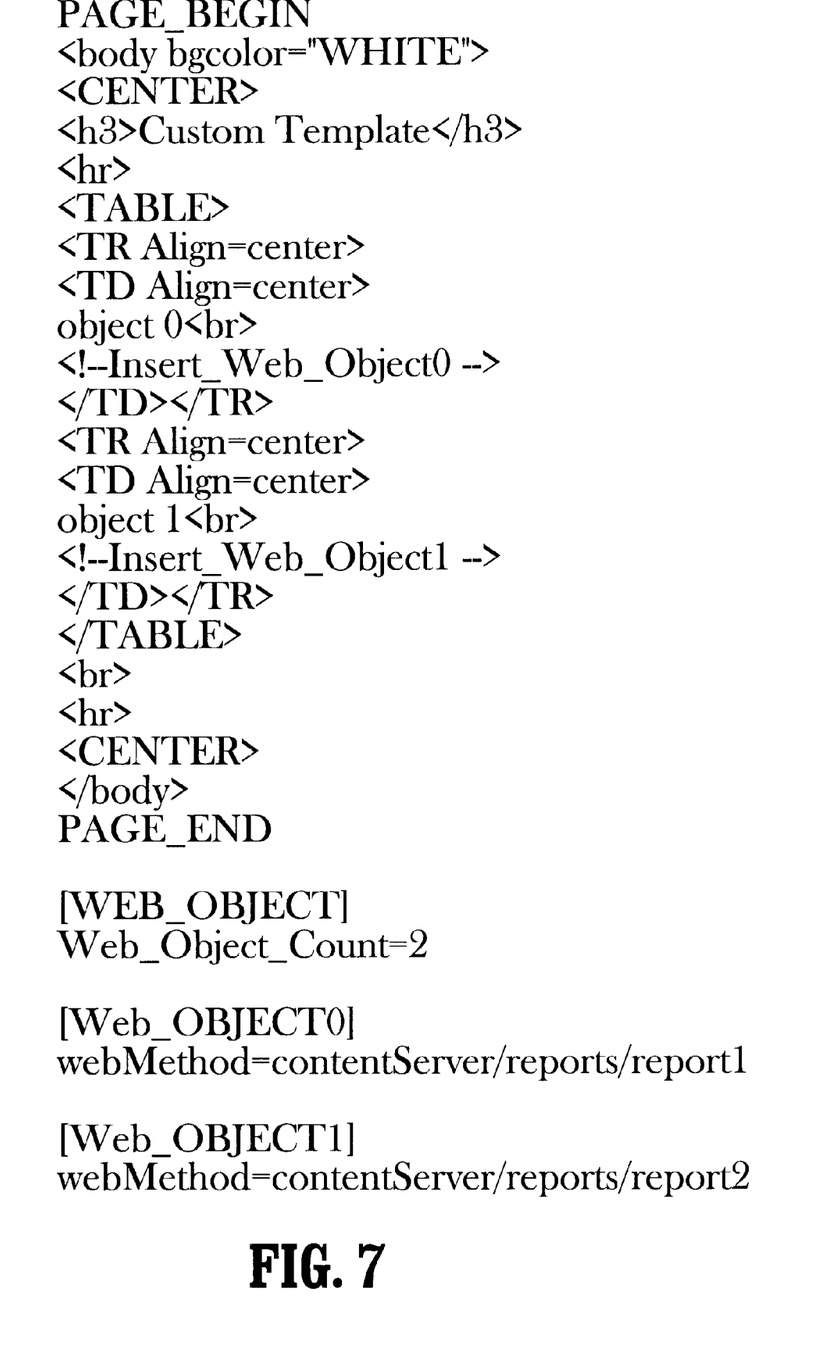
FIG. 7 illustrates one embodiment of a page template used to present two objects on a user's display.

An example of a template with two objects is shown in FIG. 7. In this case, two objects are displayed when the page is created. Again, the template begins with the "PAGE_BEGIN" tag. HTML to be displayed follows the tag. As part of the HTML the "<!--(Insert_Web_Object0-->" comment line specifies where the first object will be placed in the HTML text. The "<!--Insert_Web_Object1-->" comment line specifies where the second object will be placed in the HTML text. The "PAGE_END" tag indicates the end of HTML text and beginning of control text. The "[WEB_OBJECT]" section specifies two objects by the "Web_Object_Count=2" tag. The "[WEB_OBJECT0]" section specifies what object should be inserted by the "webMethod=contentServer/reports/report1" tag. The "[WEB OBJECT1]" section specifies what object should be inserted by the "webMethod=contentServer/reports/report2" tag.

As noted above, in one embodiment server 12 includes a search capability. In one such embodiment, content server 12 searches its objects for keywords entered in the selection box. In one embodiment, when a document is published to content server 12, data in the document is indexed by the search engine. In another embodiment, when a document is published to content server 12, only a search stub is created. This search stub is placed into a directory that is indexed by the search engine. The data in the stub is the content that is index. This data includes only the data in the publish dialogue (content, title, headline, description).

In one embodiment, context server 12 includes a set of administration functions. Access to these administration functions is via a Java applet and is restricted to users who are assigned to the admin group. The UI should take the form of an existing admin applet (like the Netscape administrator's application).

In one embodiment, the user interface is a Java applet written with a combination of Java swing classes and HTML. This implies that admin users must have access to a browser that supports JVM 1.12 or higher. The Admin UI provides the following capabilities:

Create/Add New User (single & batch)
Delete User
List Users
Create/Edit Profiles
Assign Profiles
Create/Add New Workgroup
Delete Workgroup(s)
List Workgroups
Create/Edit Report Directories
Delete Report Directories
Create/Edit Channels (Public & Workgroup)
Delete Channels (Public & Workgroup)
Populate the Content Server (single object & batch)
Edit the Repository
Start/Stop Server
Show Access Logs/User Statistics
Session Management (browser timeout settings)
Broadcast System Messages
"Kill" a user session "CreateNewUser" adds a user to the user security database. The administrator will be able to set the profile of the user that will include the Unix user-id and password, the security model, group associations and other entries in the user security record. "DeleteUser" removes a user from the security database, including the user's profile. "EditUser" makes changes to entries initially added when the user was created with "CreateNewUser", including the user's profile. "ListUser" lists the users currently existing on the system. "Create New Group" creates a new group. "Manage Group" provides all the functions needed to administer a group.

In one embodiment, content server 12 has the ability to be installed and run in multiple environments. It supports the Java internationalization classes which handle the wide byte (16 bit) character set.

In one such embodiment, the content server is localized through a specific class. The class has the following format:
public class I18n {
 //Public Constructors
 public I18n( )
 public I18n(String applet path, String Locale);
 public I18n(String Propertiesfile name, String applet path, String Locale);

//Public Instance Methods
 public String returnString(String Key, String default string);
}

The first of the three constructors takes no arguments. This constructor is used if the other two constructors fail to instantiate. This allows the returnString( ) method to return the default string even though the properties file could not be located. The second of the three constructors takes two arguments. It doesn't have the Properties File Name argument because it defaults to the Properties file called webCommon.properties. This Properties file is for strings that are common to more than one project. The last constructor takes three arguments, the Properties File Name, the applet path and the locale. The applet path is relative to the Docs directory on the web server.

The I18n class uses two JDK1.1 classes java.util.PropertyResourceBundle and java.net.URL. Java.util.PropertyResourceBundleextendsjava.util.ResourceBundle and has a Public Constructor which takes an InputStream Stream as its argument. The input stream is generated from a Properties file through the java.net.URL class. The URL class has four Public Constructors, one of its constructors takes a path/filename as its argument. The openStream method turns the given Properties file into a stream.

The Properties file is simply a text file with Key=Value pairs. The Value is the localized string and the key is the identifier for that string. The Properties file is named according to the following scheme:

project_language_country.properties where project is the name of the project, language is the language part of the locale and country is the country part of the locale.

The I18n class will first look for the language and the country, then just the language and lastly just the project. For example, a project could have the name "Content_de_DE.properties". If that Properties file isn't found, then the I18n class will look for the name "Content_de.properties". Otherwise, the class looks for "Content.properties". This last Properties file should be the default English strings.

In one embodiment, strings that are common across many projects are stored in Properties file called webCommon.properties.

Once the PropertyResourceBundle class is instantiated, the getString( ) method is used to pull information from the Properties file stream. The getString( ) method takes a string Key as its argument.

To use system 10, a user opens the system 10 application and logs into the system with her user ID and password (or other authentication mechanism). Authentication may be performed via a system 10 password check or by accessing LDAP or NIS authentication processes. (For LDAP and NIS authentication, in one embodiment the user passwords are set to ?LDAP or ?NIS, respectively, to denote external authentication.)

In one embodiment, system 10 generates a session key for the user and creates a user session in an internal session pool indexed by the session key. System 10 manages the internal session pool through a cleanup thread which monitors the session pool and removes sessions which have expired.

Once the user is successfully logged into system 10, a newspage is displayed within a navigation area. In one embodiment, the navigation area is a customizable template under the control of the administrator. Each user can have their own template. In one such embodiment, system 10 includes a template editor which operates under control of the administrator to build user, group or public specific templates. In another embodiment, a template editor is available for the users to create their own pages.

In one embodiment, headlines associated with the channel are displayed within the newspage and the user can select to read more detailed information relating to the headline simply by clicking on the headline. If the user wants to add additional channels, she simply adds the channels to her newspage.

In one embodiment, the user adds a channel to her newspage by selecting "Profile" in the navigation area, selecting "News Settings" within the "Profile" page, selecting a "Public", "Group" or Personal" newspage view, selecting the channel or channels to be added and submitting the newspage changes. The channel is then displayed on the newspage and updated information is displayed each time the user logs into system 10.

The user can access any material to which she has the correct permissions. In addition, if, the user has write permission, she can access, modify and save documents within system 10. Even if the user lacks permission to modify a document, as long as she has read permission, she can access the document, modify the document if desired and save the modified document as a new document on system 10. In addition, the user can create a new channel and populate that channel with documents relevant to that channel. For instance, if the user were an insurance agent, she might create a channel for insurance agents and publish documents to that channel. Other agents could access that channel through their respective newspages. The user can set the permissions for access to the channel. For instance, the channel may be restricted such that it is available for reading for others in the insurance agent workgroup but they cannot modify anything in the channel.

Before making a document available on a channel, the user must publish the document to the library. In one embodiment, the user does this by selecting "Library" in the navigation menu, selecting a workgroup, and selecting a "Publish" icon shown on a toolbar. The document location is highlighted, a title is entered for the document and a headline is entered that will be displayed when the document is shown within a channel. The user then sets the permissions and "published" the document to the library. The document then appears in the selected workgroup area in the library.

A link to existing documents can be made simply by publishing the URL associated with the document to a workgroup area in the library.

To publish a report from one of the information sources 14, the user logs onto an information source 14 and designs a report. The report is submitted to the information source 14 and a document generated. The user browses the virtual directory of system 10 and selects a location to publish the document. The report reference is then uploaded from information source 14 to server 26 and report information is stored in repository 22 as detailed above. A reference to the report is also stored in the content directory and a search meta file is generated and stored into index 28. At the same time the search meta file is broadcast to other content servers.

When a report is viewed by a user, he or she accesses the report from content server 26 and retrieves the document to be displayed in HTML on the user's browser. If the document is an on-demand report, the act of requesting the document causes server 26 to query the information source 14 associated with the report. In one embodiment, a URL referencing a cgi program is generated for each on-demand inquiry and an HTML document representing the results of the on-demand report request is forwarded to the user by information source 14.

The user can create messengers to add content to a channel. Messengers help the user to automate the delivery of objects to the preferred destination. They work behind the scenes to automatically update channels by broadcasting headline text messages with links to the associated content.

In one embodiment, a messenger is created by selecting "Messengers" in the navigation menu, selecting "Agent Messengers" in the Workgroup area and indicating that the messenger is a new messenger. A title and headline is entered for the messenger and a channel is selected as the location to which the messenger is posted. A period (e.g., daily) is selected and permissions are set for the messenger. The messenger is then saved and displayed in the channel selected.

In one such embodiment the action of saving the messenger results in sending messenger information to a system 10 servlet. The servlet determines the object key for the messenger and inserts the object key in repository 22. The servlet also creates a relationship between the messenger and channel in repository 22. In addition, the messenger is added to the task table is an email has been specified. A servlet maintenance thread then monitors the task table to complete scheduled tasks.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of channelizing data within a system having a user interface and a server, comprising:
   identifying, at the user interface, data to be published as published content;
   sending a request to the server identifying the data to the server;
   generating, at the server, an object key to the data to be published;
   storing the object key into a content directory as a function of values stored in a virtual directory;
   associating the object key with a channel; and
   displaying the channel on the user interface.

2. The method according to claim 1, wherein storing the object key includes updating an index to reflect storage of the object key, wherein updating an index includes placing a search meta file associated with the published content in the index.

3. The method according to claim 2, wherein updating an index further includes broadcasting the search meta file to other available servers.

4. The method according to claim 1, wherein associating the object key with a channel includes:
   creating a messenger, wherein a messenger is an automated process which alerts a user when an event occurs;
   generating a messenger object key for the messenger;
   storing the messenger object key to a repository; and
   associating the messenger with the published content; and
   wherein the method further includes scheduling the messenger to execute at a predetermined time and displaying a message regarding execution of the messenger on the user interface.

5. The method according to claim 4, wherein displaying a message includes sending an e-mail message to the user interface.

6. The method according to claim 4, wherein displaying a message includes displaying a headline associated with the published content on the user interface.

7. The method according to claim 6, wherein displaying a headline includes displaying a navigation area template.

8. The method according to claim 7, wherein the navigation area template is created by an administrator and is selected by the user.

9. The method according to claim 1, wherein identifying data to be published as published content includes providing an information source, generating a report within the information source and storing the report in a location and wherein sending a request to the server identifying the data to the server includes identifying the location where the report was stored.

10. The method according to claim 9, wherein associating the object key with a channel includes:

creating a messenger, wherein a messenger is an automated process which alerts a user when an event occurs;

generating a messenger object key for the messenger;

storing the messenger object key to a repository; and associating the messenger with the published content; and wherein the method further includes scheduling the messenger to execute at a predetermined time, displaying a message regarding execution of the messenger on the user interface and accessing the report via the messenger.

11. A system for presenting data from a plurality of sources to a user, comprising:

a plurality of information sources;

a user interface, wherein the user interface selects data from one or more of the plurality of information sources to be identified as published content and issues content requests to access data identified as published content;

content storage, wherein the content storage stores published content; and a server connected to the user interface and the content storage, wherein the server manages the content requests received from the user interface, wherein the server includes a repository and a content directory, wherein the repository manages a virtual directory structure associated with published content and wherein the content directory maintains a content directory structure pointing to all published content stored in the content storage;

wherein the content directory structure is referenced by the virtual directory structure in the repository.

12. The system according to claim 11, wherein the repository manages the virtual directory structure in terms of folders, messenger and channels;

wherein folders contain pointers to published content;

wherein messengers are automated processes which alert a user when an event occurs; and wherein channels are a logical organization of information grouped by a particular subject.

13. The system according to claim 12, wherein the server includes a scheduler which monitors and schedules processing of messengers.

14. The system according to claim 12, wherein the server manages content requests as a multi-threaded Java servlet.

15. The system according to claim 11, wherein the repository includes a security mechanism for restricting access, based on permissions, by a user to content stored in the content server.

16. The system according to claim 14, wherein the repository is stored within a relational database.

17. The system according to claim 11, wherein content requested by the user is displayed as newspages and wherein the server includes a scheduler for scheduling generation of the newspages.

18. The system according to claim 11, wherein the server includes a search engine and wherein the user interface includes means for accessing content via the search engine.

19. The system according to claim 18, wherein the content storage includes storage for a pointer file, wherein the pointer file points at data files stored on remote data storage devices.

20. A Web portal into business intelligence, comprising:

a plurality of business information sources, including a data warehouse and an on-line transaction processing system;

a user interface, wherein the user interface includes a Web browser, means for publishing data from the data warehouse and from the on-line transaction processing system as published content, means for identifying the data published and means for issuing a content request to access a document stored as published content;

content storage, wherein the content storage stores the published content; and a server connected to the user interface and the content storage, wherein the server manages the content request received from the user interface, wherein the server includes a repository and a content directory, wherein the repository contains a virtual directory structure associated with the published content and wherein the content directory contains a content directory structure pointing to all published content stored in the content storage;

wherein the server retrieves the document as a function of the content request by indirectly addressing the content directory structure through the virtual directory structure stored in the repository; and wherein the server transforms the retrieved document into a document which can be displayed on the Web browser and transfers the transformed document to the user interface.

21. The portal according to claim 20, wherein the means for identifying the data published includes means for displaying, on the user interface, a headline associated with the published content.

22. The portal according to claim 21, wherein the means for issuing a content request includes means for clicking on the headline.

23. The portal according to claim 20, wherein the data warehouse includes an agent, wherein the agent executes at a first predefined time to generate a report, and wherein the server includes a messenger, wherein the messenger is associated with the report and wherein the messenger executes at a second predefined time to remind a user to review the report.

* * * * *